US012743335B1

(12) United States Patent
Davidson et al.

(10) Patent No.: US 12,743,335 B1
(45) Date of Patent: Sep. 22, 2026

(54) ARTIFICIAL INTELLIGENCE (AI) BASED REMEDIATION OF STORAGE INSTALLATION ERRORS

(71) Applicant: Dell Products L.P., Round Rock, TX (US)

(72) Inventors: Michal Sara Davidson, Beit Shemesh (IL); Shoham Levy, Pardes Hana-Karkur (IL); Ophir Jehoshua Buchman, Raanana (IL)

(73) Assignee: Dell Products L.P., Round Rock, TX (US)

( * ) Notice: Subject to any disclaimer, the term of this patent is extended or adjusted under 35 U.S.C. 154(b) by 10 days.

(21) Appl. No.: 19/088,839

(22) Filed: Mar. 24, 2025

(51) Int. Cl.
*G06F 11/00* (2006.01)
*G06F 11/07* (2006.01)

(52) U.S. Cl.
CPC ................................ *G06F 11/0793* (2013.01)

(58) Field of Classification Search
CPC .................................................. G06F 11/0793
USPC .................................................. 717/174–178
See application file for complete search history.

(56) References Cited

U.S. PATENT DOCUMENTS 10,917,520 B1 * 2/2021 T. G .................... H04M 3/5233
2015/0052402 A1 * 2/2015 Gurumurthy ....... G06F 11/0709 714/38.1
2023/0073644 A1 * 3/2023 Thakkar ............. G06F 11/0781

* cited by examiner

*Primary Examiner* — Jason B Bryan
(74) *Attorney, Agent, or Firm* — Chamberlain, Hrdlicka, White, Williams & Aughtry; Aly Z. Dossa

(57) ABSTRACT

A method for managing installation of a storage platform includes: monitoring, by an installation monitoring agent (IMA), an installation procedure of the storage platform to obtain logs; analyzing, by the IMA, the logs to extract a report; making, by the IMA and based on the report, a first determination that an installation issue is detected during the procedure; notifying, by the IMA, a resolution agent (RA) about the installation issue; inspecting, by the RA, the storage platform by sending a request to determine that the installation issue is valid; receiving, by the RA, a response from the storage platform; making, by the RA, a second determination that the installation issue is valid; identifying, by the RA, a set of resolutions; ranking, by the RA, the set of resolutions to obtain a subset of resolutions; and initiating, by the RA, displaying of the subset of resolutions to a user.

20 Claims, 6 Drawing Sheets

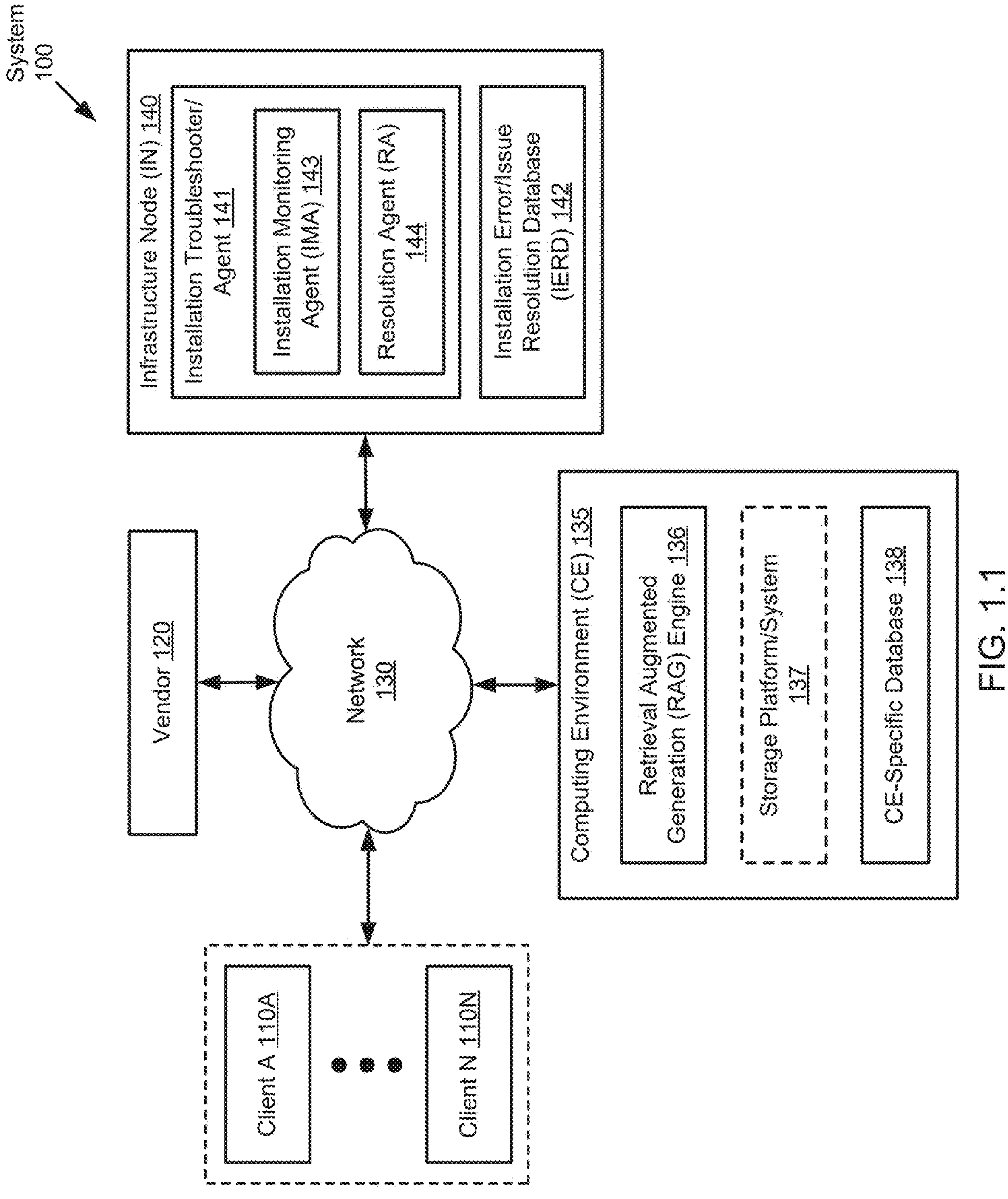
FIG. 1.1

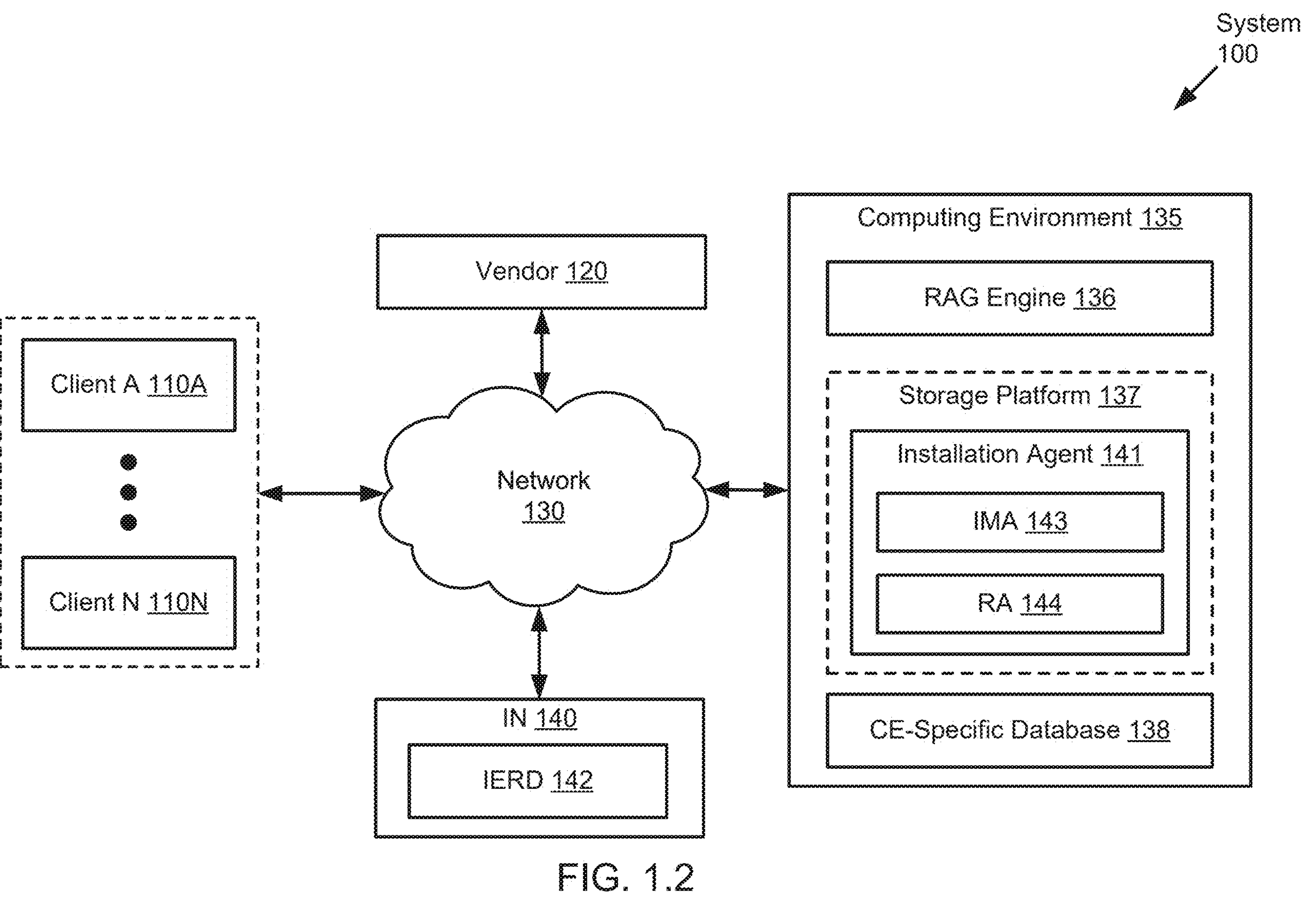
FIG. 1.2

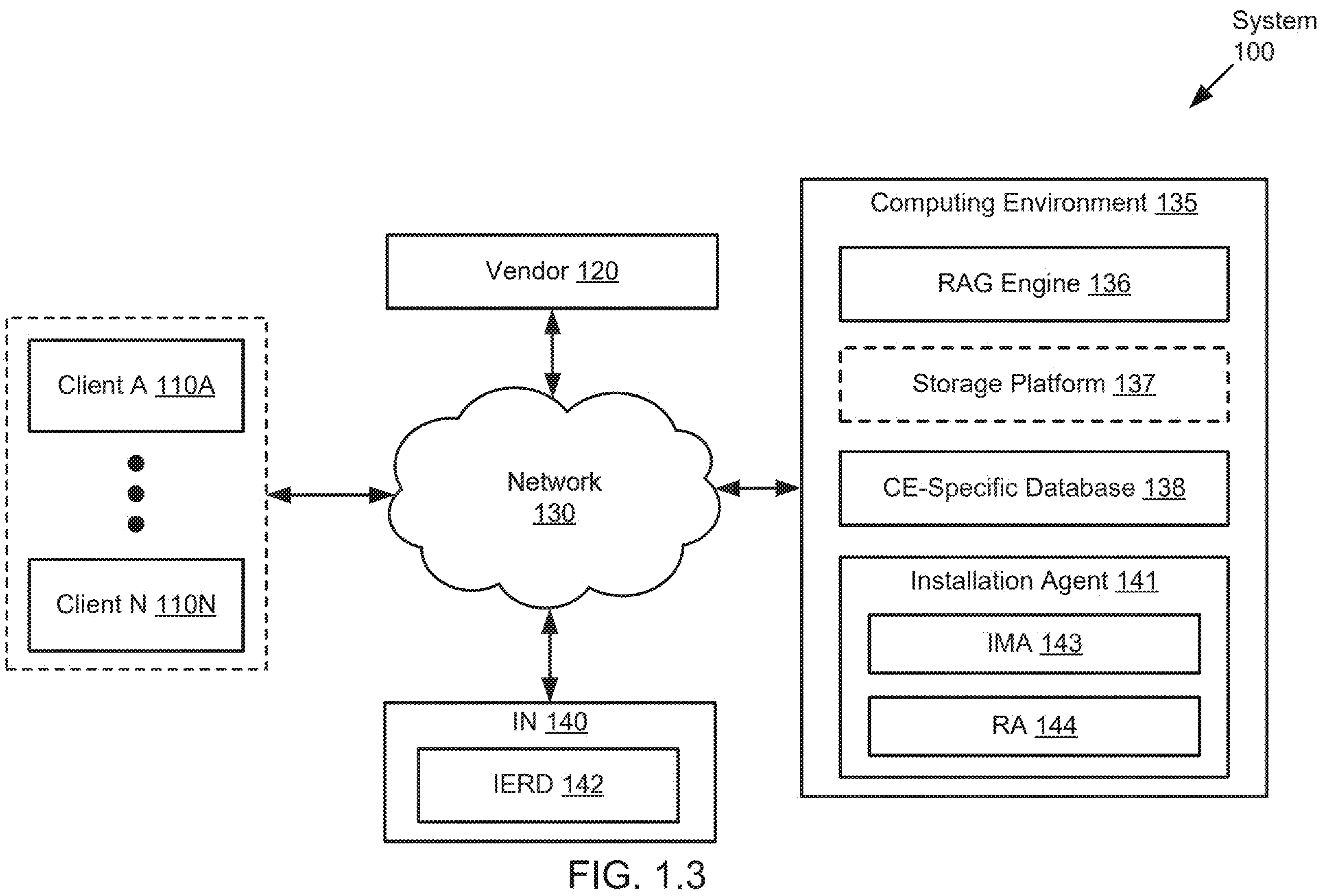
FIG. 1.3

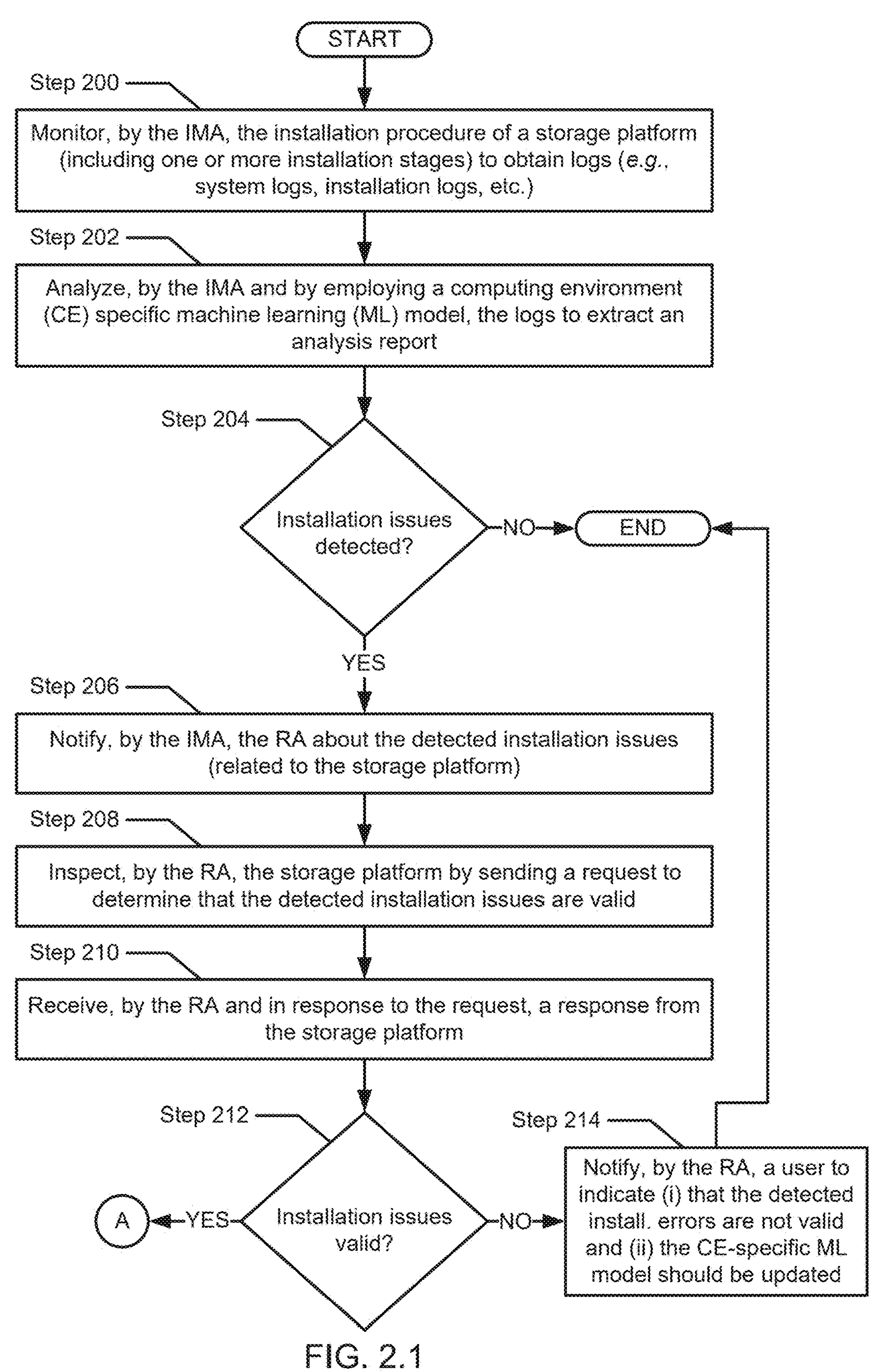
FIG. 2.1

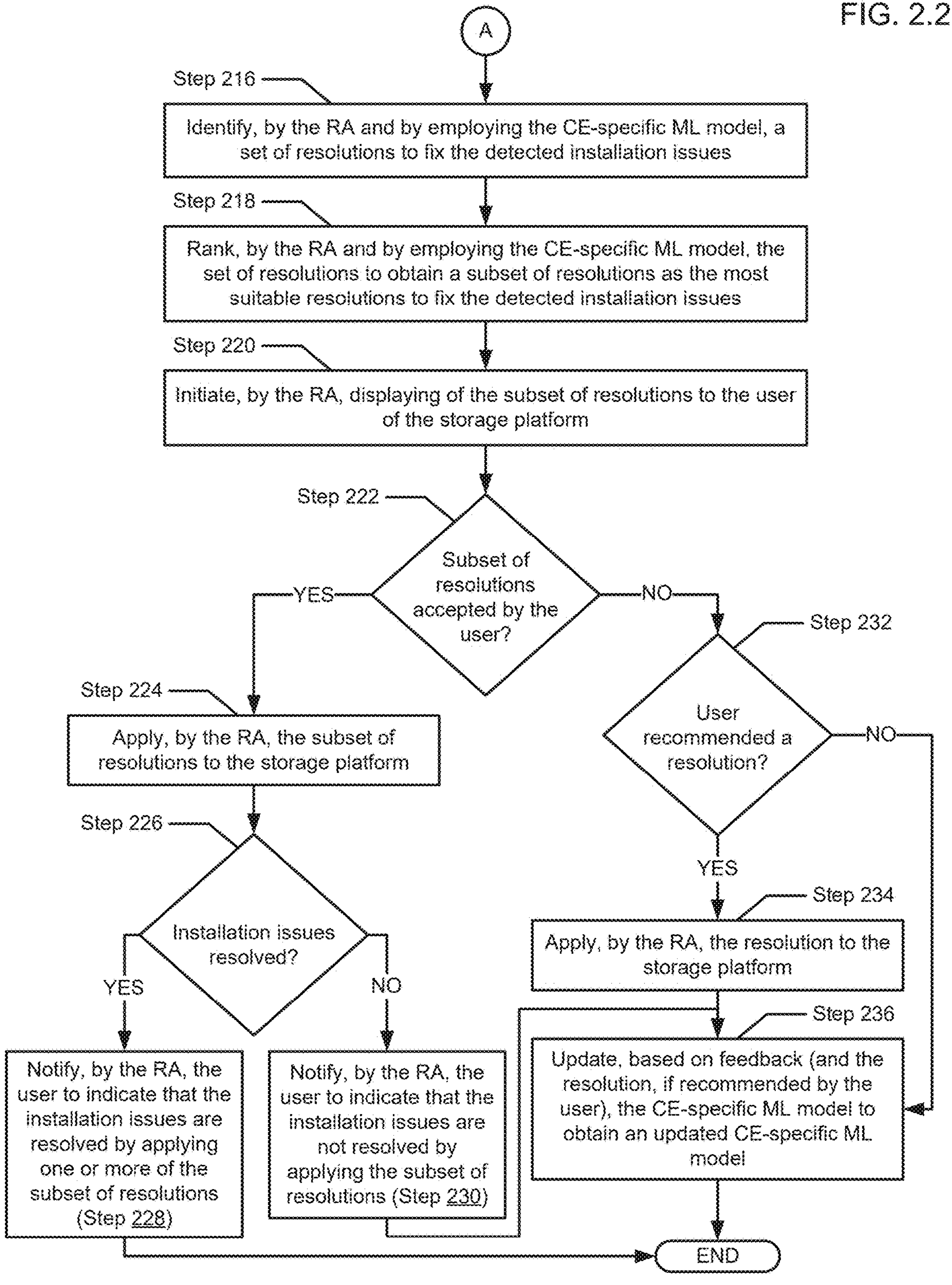
FIG. 2.2
A
Step 216
Identify, by the RA and by employing the CE-specific ML model, a set of resolutions to fix the detected installation issues
Step 218
Rank, by the RA and by employing the CE-specific ML model, the set of resolutions to obtain a subset of resolutions as the most suitable resolutions to fix the detected installation issues
Step 220
Initiate, by the RA, displaying of the subset of resolutions to the user of the storage platform
Step 222
Subset of resolutions accepted by the user?
YES
NO
Step 232
User recommended a resolution?
NO
Step 224
Apply, by the RA, the subset of resolutions to the storage platform
Step 226
Installation issues resolved?
YES
NO
YES
Step 234
Apply, by the RA, the resolution to the storage platform
Step 236
Update, based on feedback (and the resolution, if recommended by the user), the CE-specific ML model to obtain an updated CE-specific ML model
Notify, by the RA, the user to indicate that the installation issues are resolved by applying one or more of the subset of resolutions (Step 228)
Notify, by the RA, the user to indicate that the installation issues are not resolved by applying the subset of resolutions (Step 230)
END

ARTIFICIAL INTELLIGENCE (AI) BASED REMEDIATION OF STORAGE INSTALLATION ERRORS

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 1.1 shows a diagram of a system in accordance with one or more embodiments disclosed herein.

FIG. 1.2 shows a diagram of a system in accordance with one or more embodiments disclosed herein.

FIG. 1.3 shows a diagram of a system in accordance with one or more embodiments disclosed herein.

FIGS. 2.1-2.2 show a method for managing installation of a storage platform/system in accordance with one or more embodiments disclosed herein.

DETAILED DESCRIPTION

Figure 3:
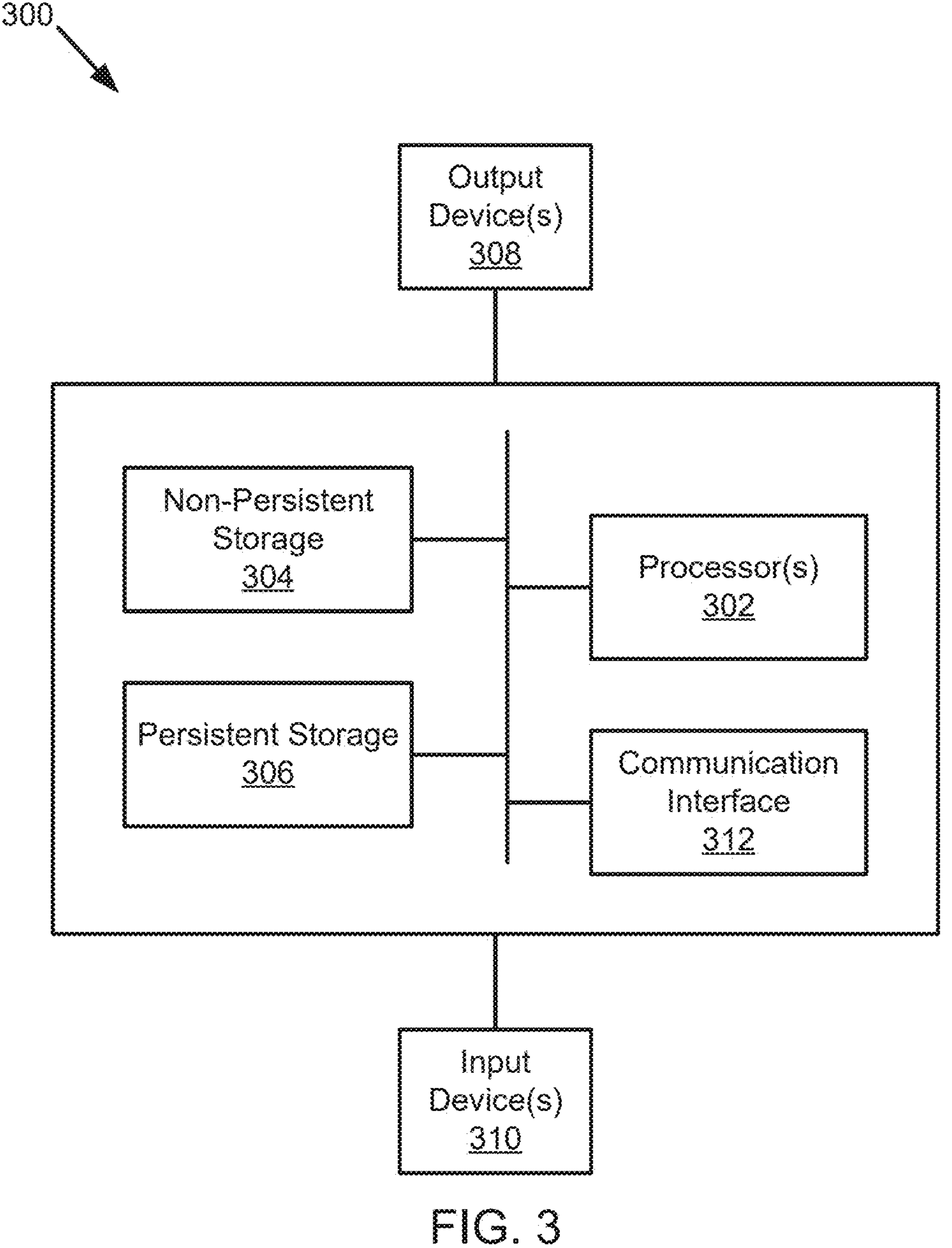
FIG. 3 shows a diagram of a computing device in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase “operatively connected” may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, within the storage industry, because of the complexity of installing storage systems (e.g., software-defined storage systems), in which (i) necessary storage software is deployed on top of a generic storage infrastructure and (ii) there is less manufacturing level control of the infrastructure, dealing with frequent storage installation errors/anomalies (e.g., storage system specific anomalies (e.g., an Internet Protocol (IP) address (of Storage Node A) specified in the system log does not match the actual IP address of Storage Node A (which means that Storage Node A is misconfigured)), generic anomalies (e.g., each storage node of the storage platform/system has a different timestamp for the same process (which means related clocks are out of sync)), operating system (OS) related errors, firmware related errors, etc.) is a resource-heavy and costly process (because the process requires manual identification (which further requires subject matter expertise) and repair of the errors), which may negatively affect a related user's/customer's experience/satisfaction.

Traditional solutions/approaches recommend a manual repair of storage system installation errors by a subject matter expert (e.g., a support engineer who is trained for installation of a specific software-defined storage system/product), which may be a costly (and time-consuming) process as well in terms of training people/engineers to make them subject matter experts. Further, automated retries within given storage system installation code may not (i) address unexpected installation errors, (ii) provide relevant remediation steps (or recommendations/resolutions) to automate the troubleshooting of the relevant storage system, and/or (iii) perform repairs (or those resolutions) on the storage system.

For at least the reasons discussed above and without requiring resource-intensive efforts (e.g., time, engineering, cost, utilization of excessive computing resources, etc.), a fundamentally different approach/framework is needed (e.g., a framework that utilizes machine learning (ML)/AI models/algorithms to identify and perform remediations for errors/anomalies occurred during installation/deployment of a related storage system).

Embodiments disclosed herein relate to methods and systems to manage installation of a storage platform/system. As a result of the processes discussed below, one or more embodiments disclosed herein advantageously ensure that: (i) the advantage of performing AI-based identification and performance of remediations for installation errors related to a storage system (e.g., a software-defined storage system) (a) reduces resource-intensive efforts drastically, (b) improves customer/user satisfaction (with the storage system), and (c) improves quality and stability of the storage system; (ii) the framework automates identification and application of the relevant remediation steps for the installation errors in order to automate the troubleshooting of the storage system; (iii) through availability (and capability) of local processors (e.g., central processing units (CPUs), graphics processing units (GPUs), etc.) (said another way, by having the capability to perform AI calculations locally within the storage system (see FIG. 1.2)), the framework can enable the storage system (to be installed/deployed) to execute necessary calculations (a) to identify errors occurred during the installation of the system, (b) to automatically identify related fixes (e.g., remediation steps) to overcome those errors during the installation of the system, and (c) to enable a faster troubleshooting/repair of the system using the identified fixes (without a user/human intervention); (iv) the framework supports customization and continuous adjustments (with respect to the storage system such as, for example, firmware/software updates that are received during the installation of the system, driver updates that are performed during the installation of the system, etc.) in order to stay up-to-date with vendor- and/or user-initiated generic and/or specific infrastructure changes; (v) utilizing AI/ML models to identify remediations for anomalies (e.g., infrastructure/product related anomalies, software related installation anomalies, etc.) and to apply those remediations to repair the storage system while the system is being installed offer significant cost and engineering benefits, along with increased storage system quality, durability, stability, and customer satisfaction.

The following describes various embodiments disclosed herein.

FIG. 1.1 shows a diagram of a system (100) in accordance with one or more embodiments disclosed herein. The system (100) includes any number of clients (e.g., Client A (110A), Client N (110N), etc.), a vendor (120), any number of infrastructure nodes (INs) (e.g., 140), a computing environment (135), and a network (130). The system (100) may include additional, fewer, and/or different components without departing from the scope of the embodiments disclosed herein. Each component may be operably/operatively connected to any of the other components via any combination of wired and/or wireless connections. Each component illustrated in FIG. 1.1 is discussed below.

In one or more embodiments, the clients (e.g., 110A, 110N, etc.), the vendor (120), the IN (140), the computing environment (135), and the network (130) may be (or may include) physical hardware or logical devices, as discussed below. While FIG. 1.1 shows a specific configuration of the system (100), other configurations may be used without departing from the scope of the embodiments disclosed herein (see FIGS. 1.1-1.3). For example, although the clients (e.g., 110A, 110N, etc.) and the IN (140) are shown to be operatively connected through a communication network (e.g., 130), the clients (e.g., 110A, 110N, etc.) and the IN (140) may be directly connected (e.g., without an intervening communication network).

Further, the functioning of the clients (e.g., 110A, 110N, etc.) and the IN (140) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.1.

In one or more embodiments, the clients (e.g., 110A, 110N, etc.) may be a part of an internal information technology (IT) environment (e.g., a users' site), and the IN (140) and the computing environment (135) may be a part of an external IT environment (e.g., a private (or a public) cloud environment provided by a third-party vendor/organization). Separately, in one or more embodiments, the clients (e.g., 110A, 110N, etc.) and the computing environment (135) may be a part of the internal IT environment, and the IN (140) may be a part of the external IT environment. In one or more embodiments, the computing environment (135) may be a data center or a virtual private cloud computing environment, associated with a user of a client (e.g., 110A).

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

As used herein, a "volume" may be analogous to a logical unit number in a storage area network (SAN), in which a volume may be a subset of a storage system's (e.g., 137, FIG. 1.1) capacity presented by a storage node of the storage as a local block device. A volume's data may be evenly distributed across all storage resources of the storage system, for example, according to a data layout selected for the storage system.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, data deduplication, etc.), storage capacity (e.g., data backup), and data protection (e.g., software-defined data protection, disaster recovery, etc.) as a service to users (e.g., people) of clients (e.g., 110A, 110N, etc.). For example, the system may be configured to organize unbounded, continuously generated data into a data stream. The system (100) may also represent a comprehensive middleware layer executing on computing devices (e.g., 300, FIG. 3) that supports application and storage environments.

In one or more embodiments, the system (100) may support one or more virtual machine (VM) environments (e.g., 135), and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (140)) from the users. By doing so, the users may utilize different computing devices (e.g., 300, FIG. 3) that have different quantities of computing resources (e.g., processing cycles, memory, storage, etc.) while still being afforded consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as a universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (140)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (140). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or a computing device operated by one or more individuals of (or employed by) an organization. Examples of said individual(s) may include, but not limited to, any organization executive(s) (e.g., chief executive officer (CEO), chief financial officer (CFO), etc.), and any employee(s) in the accounting/finance team of the organization (e.g., a collector person). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (140). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (140) and/or the vendor (120) that perform computations necessary to provide the computer-implemented services, (iv) using the computations performed by, for example, the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a GPU, a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (140)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an IP address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be considered without departing from the scope of the embodiments disclosed herein.

Further, in one or more embodiments, a client (e.g., 110A, 110N, etc.) may be implemented as a computing device (e.g., 300, FIG. 3). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing virtualization technology. In one or more embodiments, an administrator may be a user with permission (e.g., a user that has root-level access) to make changes to the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 300, FIG. 3) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (140) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (140) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the storage for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or ML models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to a storage system (e.g., 137); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or to the storage; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (140) may communicate with, for example, storage systems in the system (100).

As described above, the IN (140) may be capable of providing a range of functionalities/services to the users of the clients (e.g., 110A, 110N, etc.). However, not all users may be allowed to receive all the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (140) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (140) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (140) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of an SLA (or a rule) that applies to source data, identity of a target device where source data is to be stored, etc.

As used herein, the term "backup" is intended to be broad in scope. In this manner, example backups (in connection with which embodiments disclosed herein) may be employed include (but not limited to): full backups, partial backups, clones, snapshots, incremental backups, differential backups, etc.

As used herein, "data retention" is a period of time, with a definite start and end, within which the data should be retained in a storage system (e.g., 137). For example, a set of user requirements and/or technical considerations (e.g., security considerations, performance considerations, etc.) of a data center may be used to generate a data retention policy specifying that user data should be retained in the database for seven years.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

Further, while a single IN (e.g., 140) is considered above, the term "node" includes any collection of systems or sub-systems that individually or jointly execute a set, or multiple sets, of instructions to provide one or more computer-implemented services. For example, a single IN/server/host may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (140) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (140) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

In one or more embodiments, the IN (140) may host an installation troubleshooter/agent (141) and an installation error/issue resolution database (IERD) (142). Referring to FIG. 1.1, the installation agent (141) is demonstrated as a part of the IN (140); however, embodiments disclosed herein are not limited as such. The installation agent (141) may be demonstrated (i) as a part of the storage system (137) that is being installed (in/to the computing environment (135)), where (a) the storage system (137) may have the required computing resources to execute the installation agent (141) and the IN (140) may not have the required computing resources to execute the installation agent (141), and (b) because of security concerns (where the installation error detection and remediation have to be performed within the same environment (e.g., the internal IT environment) as the clients, indicating that the clients and the computing environment (135) are hosted by the internal IT environment) (see FIG. 1.2), (ii) as a part of the IN (140), where the storage system (137) or the computing environment (135) may not have the required computing resources to execute the installation agent (141) and the IN (140) may have the required computing resources to execute the installation agent (141) (see FIG. 1.1), and/or (iii) as a part of the computing environment (135) (but outside of the storage system (137) that is being installed), where (a) the computing environment (135) may have the required computing resources to execute the installation agent (141), (b) the storage system (137) and the IN (140) may not have the required computing resources to execute the installation agent (141), and (c) because of security concerns (where the installation error detection and remediation have to be performed within the same environment (e.g., the internal IT environment) as the clients, indicating that the clients and the computing environment (135) are hosted by the internal IT environment) (see FIG. 1.3).

As discussed above, the installation agent (141) may be deployed externally to the storage system/platform (137) (e.g., a software-defined storage system) to manage the storage system's installation process, which monitors the installation process of the storage system (via its installation monitoring agent (IMA) (143)) and when an installation error(s) are identified during the installation process, utilizes its resolution agent (RA) (144) to identify and apply/perform remediations for the installation errors.

In one or more embodiments, as being a physical computing device or a logical computing device, the installation agent (141) may include functionality to, at least: (i) via the IMA (143), perform an AI-based (or AI/ML model based) analysis of installation errors related to the storage system (137) (that is being installed) and AI-based "proactive" identification of possible installation errors (that may occur later while the system is being installed) for the storage system (137); (ii) via the RA (144), perform AI-based identification and application/performance of related fixes (e.g., remediation steps, resolutions, etc.) to automatically overcome/resolve the errors (that are identified in (i)) for a faster troubleshooting of the storage system (137); (iii) via the IMA (143) and/or the RA (144), support customization and continuous adjustments (with respect to the storage system (137) such as, for example, firmware/software updates that are received during the installation of the storage system, driver updates that are performed during the installation of the storage system, etc.) in order to stay up-to-date with vendor- and/or user-initiated generic and/or specific infrastructure changes; and/or (iv) via the IMA (143) and/or the RA (144), increase the storage system's (137) quality, durability, and stability by employing AI/ML models to identify current anomalies (e.g., infrastructure/product related anomalies, software related installation anomalies, etc.), to forecast/identify possible errors that may occur later while the storage system is being installed, and to repair the storage system while the storage system is being installed.

One of ordinary skill will appreciate that the "natural language processing (NLP) based" installation agent (141) may perform other functionalities without departing from the scope of the embodiments disclosed herein. In one or more embodiments, the installation agent (141) (via the IMA (143) and the RA (144)) may be configured to perform all, or a portion, of the functionalities described in FIGS. 2.1-2.2. The installation agent (141) (more specifically, each of the IMA (143) and the RA (144)) may be implemented as a computing device using hardware (e.g., any number of integrated circuits for processing computer readable instructions, implemented on a corresponding entity's (e.g., 140, 137, 135, etc.) GPU(s), etc.), software (e.g., a computer program), or any combination thereof.

In one or more embodiments, to provide its functionalities (e.g., utilizing ML/AI models, at least, to identify errors occurred during installation of a related storage system, to forecast other installation errors that may occur during the installation of the storage system), and to identify and apply remediation steps for those errors, the installation agent (141) may employ a set of ML/AI models (e.g., large language models (LLMs)), which are (i) initially trained (at the vendor (120), as being the storage system provider) on a vast dataset (e.g., anonymized installation logs and/or errors obtained from multiple storage systems/products, remediation steps that are identified and applied to fix those errors, etc.) to identify generic and cross-domain installation errors (e.g., network related errors/anomalies, firmware related errors, OS related errors, etc.) and to generate/identify remediation steps in order to fix/resolve those errors, and (ii) refined (e.g., fine-tuned, augmented, etc., by the installation agent (141)) based on, at least, (a) customer environment specific data and (b) storage system specific data (using content embeddings).

In order to fine-tune a vendor trained ML model (e.g., in order to convert the vendor trained ML model into a customer environment specific ML model, in order to obtain a fine-tuned model, for the local usage of the trained ML model, etc.), the installation agent (141) may use a retrieval-augmented generation (RAG) engine (136) (which is local to (or hosted by) the customer environment (135)), in which the RAG engine (136) may provide content embeddings of customer environment specific data (e.g., data that is specific to the computing environment (135), in which the data may specify manual repair operations/fixes performed (or recommended) by a user of the storage system (137) in order to resolve an installation error associated with the storage system, installation duration time and an expected state of the storage system, etc.) and storage system specific data to the installation agent (141) (while being compliant to a corresponding user's security and privacy concerns around sensitivity of these data). With this way, the installation agent (141) may support frequent updates on/to the fine-tuned model without requiring the customer environment specific data and storage system specific data (e.g., system logs, installation logs, application logs, etc., associated with the installation of the storage platform (137)) to be shared with the vendor (120) and, thus, the user's security and privacy concerns around sensitivity of these data (e.g., network configuration information of the storage platform (137), one or more certificates of the storage platform, one or more IP addresses used by the storage system, etc.) would be allayed.

One of ordinary skill will appreciate that the installation agent (141) (more specifically, the IMA (143) and the RA (144)) may be used in other use cases (e.g., not just while the storage system (137) is being installed) without departing from the scope of the embodiments disclosed herein. For example, the installation agent (141) may be used (e.g., to perform its functionalities) after a corresponding storage system is deployed to the computing environment (135). As yet another example, the installation agent (141) may be used (e.g., to perform its functionalities) after a related user has deployed additional hardware components and/or software components to an already installed storage system.

Turning now to the IERD (142), the IERD (142) may provide long-term, durable, high read/write throughput data storage/protection with near-infinite scale and low-cost. The IERD (142) may be a fully managed cloud/remote (or local) storage (e.g., pluggable storage, object storage, block storage, file system storage, data stream storage, Web servers, unstructured storage, etc.) that acts as a shared storage/memory resource (e.g., across different computing environments in the system (100)) that is functional to store unstructured and/or structured data. For example, the IERD (142) may store data (e.g., backup data; file system metadata; assets; rules and/or procedures for performing backups of the IN (140); etc.). Further, the IERD (142) may also occupy a portion of a physical storage/memory device or, alternatively, may span across multiple physical storage/memory devices. The IERD (142) may include other and/or additional functionalities without departing from embodiments disclosed herein.

In one or more embodiments, the IERD (142) may be implemented using physical devices that provide data storage services (e.g., storing data and providing copies of previously stored data). The devices that provide data storage services may include hardware devices and/or logical devices. For example, the IERD (142) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the IERD (142) may include a memory device (e.g., a dual in-line memory device), in which data is stored and from which copies of previously stored data are provided. As yet another example, the IERD (142) may include a persistent storage device (e.g., an SSD), in which data is stored and from which copies of previously stored data is provided. As yet another example, the IERD (142) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the IERD (142) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, as being an always up-to-date vectorized database, the IERD (142) may store/log/record unstructured and/or structured data that may include (or specify), for example (but not limited to): a backup policy/practice; telemetry data including past and present device usage of one or more computing devices; data for execution of applications/services including IN applications and associated end-points; corpuses of annotated data used to build/generate and train processing classifiers for trained ML models; linear, non-linear, and/or ML model parameters; data tags; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; an identifier of a user (e.g., a unique string or combination of bits associated with a particular user) who initiated a backup (via a client); a distributed model identifier that uniquely identifies a distributed model; a user activity performed on a data item; a cumulative history of user/administrator activity records obtained over a prolonged period of time; a setting (and a version) of a mission critical application executing on the IN (140); configuration information associated with the IN (140); a job detail of a job that has been initiated by the IN; a type of the job (e.g., a non-parallel processing job, a parallel processing job, an analytics job, etc.); information associated with a hardware resource set (discussed below) of the IN; a completion timestamp encoding a date and/or time reflective of the successful completion of a job; a time duration reflecting the length of time expended for executing and completing a job; a backup retention period associated with an asset (e.g., data item); a status of a job (e.g., how many jobs are still active, how many jobs are completed, etc.); a number of requests handled (in parallel) per minute (or per second, per hour, etc.) by the IN (140); a number of errors encountered when handling a job (e.g., a backup process); a documentation that shows how the IN (140) performs against an SLO and/or an SLA; a set of requests received by the IN (140); a set of responses provided (by the IN) to those requests; information regarding an administrator (e.g., a high priority trusted administrator, a low priority trusted administrator, etc.) related to a job; tier/level information of a user (e.g., a high-privileged user, a low-privileged user, etc.); a geographic location (e.g., a country) associated with the user; a timestamp showing when a specific request is processed by the IN (140); computing resource details (including details of hardware components and/or software components) and an IP address of an IN (e.g., 140) hosting an application where a specific request is processed; information with respect to historical metadata (e.g., system logs, applications logs, telemetry data including past and present device usage of one or more computing devices in the system (100), etc.); computing resource details and an IP address of a client that sent a specific request (e.g., to the IN (140)); a set of resolutions (e.g., an existing knowledge base (KB) article, a user command as a workaround document, a technical support history documentation of a customer/user, a port's user guide, a port's release note, a community forum question and its associated answer, a catalog file of an application upgrade, details of a compatible OS version for an application upgrade to be installed, an application upgrade sequence, a release note for a software failure, etc.) to remediate/fix identified storage system installation anomalies/errors; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; one or more identified storage system installation anomalies (e.g., content/vector embeddings of the identified storage system installation errors (current or predicted), warnings, alerts, etc.); etc.

In one or more embodiments, information associated with a hardware resource set (e.g., including at least resource related parameters) may specify, for example (but not limited to): a configurable CPU option (e.g., a valid/legitimate vCPU count for the IN (140)), a configurable network resource option (e.g., enabling/disabling single-root input/output virtualization (SR-IOV) for the IN (140)), a configurable memory option (e.g., maximum and minimum memory for the IN (140)), a configurable GPU option (e.g., allowable scheduling policy and/or virtual GPU (vGPU) count combinations for the IN (140)), a configurable DPU option (e.g., legitimacy of disabling inter-integrated circuit (I2C) for the IN (140)), a configurable storage space option (e.g., a list of disk cloning technologies across one or more INs in the system (100)), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, metadata (e.g., system logs, application logs, etc.) may be obtained (or dynamically fetched) as they become available (e.g., with no user manual intervention), or by the installation agent (141) polling a corresponding client (e.g., 110A) (by making schedule-driven/periodic application programming interface (API) calls to the client without affecting the client's ongoing production workloads) for newer metadata, for example, before analyzing a health state of the client. Based on receiving the API calls from the agent, the client may allow the engine to obtain the metadata.

In one or more embodiments, the metadata may be obtained (or streamed) continuously as they generated, or they may be obtained in batches, for example, in scenarios where (i) the installation agent (141) receives a metadata analysis request (or a health state check request for a client), (ii) another IN of the system (100) accumulates the metadata and provides them to the agent at fixed time intervals, or (iii) a storage (not shown) stores the metadata and notify the agent to access the metadata from the storage. In one or more embodiments, metadata may be access-protected for a transmission from the storage to the installation agent (141), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the IERD (142), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors (e.g., 120)) and/or by the administrators based on, for example, newer (e.g., updated) versions of external information. The unstructured and/or structured data may also be updated when, for example (but not limited to): a set of newer backup rules is received, an ongoing backup process is fully completed, a state of the IN (140) is changed, etc.

While the IERD (142) has been illustrated and described as including a limited number and type of data, the IERD (142) may store additional, less, and/or different data without departing from the scope of the embodiments disclosed herein. One of ordinary skill will appreciate that the IERD (142) may perform other functionalities without departing from the scope of the embodiments disclosed herein.

In one or more embodiments, the IN (140) may be implemented as a computing device (e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (140) may also be implemented as a logical device.

Turning now to the vendor/manufacturer (120), as being a trusted facility/site, the vendor (120) may be part of a supply chain route (that may be traversed by an enterprise product (e.g., the storage platform (137)), in which the supply chain route may outline a sequence of trusted sites through which the enterprise product transitions during its lifetime.

In one or more embodiments, the vendor (120) may reference a trusted facility where a supplier of an enterprise product (e.g., a physical product such as an edge device, a logical product such as a software program or an application to install the storage system (137) to the computing environment (135), etc.) may manufacture the enterprise product in part or in entirety. Manufacturing of an enterprise product may include one or more steps/stages, for example (but not limited to): steps of a developer/administrator flow of an application; steps of generating an ownership voucher (OV) (based on the credentials specified in device initialization (DI) process/protocol (where the OV may not be stored in the corresponding edge device; instead, the OV may be transmitted along the supply chain route to mirror the storage system's progress); steps of initial provisioning of the storage system; steps of generating a public and private key pair for the storage system (before shipping the storage system to a user/customer), where the public key of the key pair is embedded into a corresponding OV; manufacturing of chassis and front panel parts; subassembly of chassis parts to obtain a chassis; integration of a chassis and front panel parts to obtain a chassis enclosure; procurement of a power supply and/or cables and/or a backplane; integration of a power supply and/or cables and/or a backplane into a chassis enclosure; procurement of a baseboard and integration thereof into a chassis enclosure; procurement of one or more expansion cards and integration thereof into a chassis enclosure; procurement of one or more storage devices and integration thereof into a chassis enclosure; procurement of parts such as computer processors (e.g., CPUs, DPUs, etc.) as well as computer memory and integration thereof into a chassis enclosure to obtain a fully-assembled enterprise product; installation of an OS, zero or more software applications, and/or firmware onto a fully-assembled enterprise product to obtain a fully-integrated enterprise product; etc.

In one or more embodiments, the aforementioned enterprise product manufacturing steps may be performed across one or more vendors. Further, the vendor (120) may include functionality to service (e.g., providing technical support for installation anomalies such as providing recommendations (e.g., remediation steps) and/or fixes for hardware and/or software failures), upgrade, troubleshoot, test, package, and/or distribute various different enterprise products. One of ordinary skill will appreciate that the vendor (120) may perform other functionalities without departing from the scope of the embodiments disclosed herein.

Turning now to the computing environment (135), the computing environment (135) hosts, at least, the RAG engine (136), the storage system (137) (that is being deployed, illustrated by dashed lines), and a customer environment (CE) specific database (138).

In addition to its aforementioned functionalities, one of ordinary skill will appreciate that the RAG engine (136) may perform other functionalities without departing from the scope of the embodiments disclosed herein. The RAG engine (136) may be implemented as a computing device using hardware (e.g., any number of integrated circuits for processing computer readable instructions), software (e.g., a computer program), or any combination thereof.

In one or more embodiments, the storage platform/system (137) may be, for example (but not limited to): a block-based backup storage system/mechanism, a file-based backup storage system, a metadata-based backup storage system, a distributed dedupe storage platform, a storage array, a single storage node, a software-defined storage system, an object storage system (e.g., a cloud-based storage system), etc.

Turning now to the CE-specific database (138), the CE-specific database (138) may provide long-term, durable, high read/write throughput data storage/protection with near-infinite scale and low-cost. The CE-specific database (138) may be a fully managed cloud/remote (or local) storage (e.g., pluggable storage, object storage, block storage, file system storage, data stream storage, Web servers, unstructured storage, etc.) that acts as a storage/memory resource that is functional to store unstructured and/or structured data. For example, the CE-specific database (138) may store data (e.g., backup data; file system metadata; assets; rules and/or procedures for performing backups of the storage system (137); etc.). Further, the CE-specific database (138) may also occupy a portion of a physical storage/memory device or, alternatively, may span across multiple physical storage/memory devices. The CE-specific database (138) may include other and/or additional functionalities without departing from embodiments disclosed herein.

In one or more embodiments, the CE-specific database (138) may be implemented using physical devices that provide data storage services (e.g., storing data and providing copies of previously stored data). The devices that provide data storage services may include hardware devices and/or logical devices. For example, the CE-specific database (138) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the CE-specific database (138) may include a memory device (e.g., a dual in-line memory device), in which data is stored and from which copies of previously stored data are provided. As yet another example, the CE-specific database (138) may include a persistent storage device (e.g., an SSD), in which data is stored and from which copies of previously stored data is provided. As yet another example, the CE-specific database (138) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the CE-specific database (138) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, as being an always up-to-date vectorized database (mainly used by the RAG engine (136) to perform its functionalities), the CE-specific database (138) may store/log/record unstructured and/or structured data (e.g., content embeddings of customer/user environment specific data (e.g., data that is specific to the computing environment (135))) that may include (or specify), for example (but not limited to): a set of network configurations of the computing environment (135); a set of certificates related to the computing environment (135); a set of security certification configurations of the computing environment (135); a set of OS configurations of the computing environment (135); a set of firewall configurations of the computing environment (135); information with respect to a network topology of the computing environment (135); a documentation that shows how the RAG engine (136) performs against an SLO and/or an SLA; a setting (and a version) of a mission critical application executing on the RAG engine (136); configuration information associated with the RAG engine (136); a job detail of a job that has been initiated by the RAG engine (136); a type of the job (e.g., a non-parallel processing job, a parallel processing job, an analytics job, etc.); information associated with a hardware resource set (discussed above) of the RAG engine (136); etc.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the CE-specific database (138), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) and/or by the administrators based on, for example, newer (e.g., updated) versions of external information. The unstructured and/or structured data may also be updated when, for example (but not limited to): a set of newer backup rules is received, an ongoing backup process is fully completed, a state of the RAG engine (136) is changed, etc.

While the CE-specific database (138) has been illustrated and described as including a limited number and type of data, the CE-specific database (138) may store additional, less, and/or different data without departing from the scope of the embodiments disclosed herein. One of ordinary skill will appreciate that the CE-specific database (138) may perform other functionalities without departing from the scope of the embodiments disclosed herein.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, the storage nodes, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

While FIG. 1.1 shows a configuration of components, other system configurations may be used without departing from the scope of the embodiments disclosed herein.

Turning now to FIG. 1.2, FIG. 1.2 shows a diagram of the system (100) in accordance with one or more embodiments disclosed herein. In one or more embodiments and as discussed above, the installation agent (141) (and its components) may be a part of the storage system (137) that is being installed (in/to the computing environment (135)), for example, (a) because the storage system (137) may have the required computing resources to execute the installation agent (141) and the IN (140) may not have the required computing resources to execute the installation agent (141), and (b) because of security concerns (where the installation error detection and remediation have to be performed within the same environment as the clients, indicating that the clients and the computing environment (135) are hosted by the same environment).

While FIG. 1.2 shows a configuration of components, other system configurations may be used without departing from the scope of the embodiments disclosed herein.

Turning now to FIG. 1.3, FIG. 1.3 shows a diagram of the system (100) in accordance with one or more embodiments disclosed herein. In one or more embodiments and as discussed above, the installation agent (141) (and its components) may be a part of the computing environment (135) (but outside of the storage system (137) that is being installed), for example, (a) because the computing environment (135) may have the required computing resources to execute the installation agent (141), (b) because the storage system (137) and the IN (140) may not have the required computing resources to execute the installation agent (141), and (c) because of security concerns (where the installation error detection and remediation have to be performed within the same environment as the clients, indicating that the clients and the computing environment (135) are hosted by the same environment).

While FIG. 1.3 shows a configuration of components, other system configurations may be used without departing from the scope of the embodiments disclosed herein.

FIGS. 2.1-2.2 show a method for managing installation of a storage platform (e.g., 137, FIG. 1.1) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

In one or more embodiments, the method described in FIGS. 2.1-2.2 may allow (i) identification of remediations (for generic and/or customer environment specific storage system installation errors) and (ii) learning from manual support/remediation operations (performed by a relevant user/customer of the storage system) to overcome these errors, while providing a strong security and privacy guarantee to the customer.

Turning now to FIG. 2.1, the method shown in FIG. 2.1 may be executed by, for example, the above-discussed IMA (e.g., 143, FIG. 1.1), RA (e.g., 144, FIG. 1.1), and RAG engine (e.g., 136, FIG. 1.1). Other components of the system (100) illustrated in FIG. 1.1 may also execute all or part of the method shown in FIG. 2.1 without departing from the scope of the embodiments disclosed herein.

In Step 200, the IMA (e.g., a sniffer component) monitors the installation procedure/process of the storage platform (including one or more installation stages) to obtain logs (e.g., system logs, installation logs, application logs, etc.) associated with the installation of the storage platform. In one or more embodiments, the logs may include (or specify), for example (but not limited to): a set of system anomalies, a set of installation errors, a set of indicators that may trigger an installation error at a later stage of the installation procedure, a severity status of an installation error (e.g., a critical installation error, a non-critical installation error, etc.), a set of warnings/alerts/notifications (e.g., "not enough drivers identified!") that may trigger an installation error at a later stage of the installation procedure, etc. In one or more embodiments, the storage platform (e.g., a software-defined storage platform) may be installed to the customer environment (e.g., 135, FIG. 1.1) that is related to a user/customer.

In Step 202, by employing a CE-specific ML model (e.g., the fine-tuned model), the IMA analyzes the logs to extract an analysis report. Referring to FIG. 1.1, the vendor (e.g., 120, FIG. 1.1) may train an ML model before the ML model is converted into the CE-specific ML model. In one or more embodiments, the ML model may be converted into (e.g., by the installation agent (e.g., 141, FIG. 1.1)) the CE-specific model by fine-tuning the ML model, based on customer environment specific data (see FIG. 1.1) obtained from the RAG engine.

In Step 204, based on the analysis report and using the CE-specific ML model, the IMA makes a first determination (in real-time or near real-time) as to whether any installation issues (e.g., errors, anomalies, etc.) related to the storage system (that is being installed) are detected during the installation procedure. Accordingly, in one or more embodiments, if the result of the first determination is YES, the method proceeds to Step 206. If the result of the first determination is NO, the method may end following Step 204.

In one or more embodiments, a detected installation issue may be (i) a current installation issue that occurred during the installation procedure or (ii) a proactively forecasted installation issue (based on, for example, system misconfigurations, warnings specified in the logs, etc.) that would highly occur (and may lead to other installation errors) at a later installation stage of the installation procedure. By proactively forecasting an installation issue, related fixes (or remediation steps) for that error may be identified (in Step 216 of FIG. 2.2) in advance for a faster troubleshooting of the storage system.

In one or more embodiments, a detected installation issue may be, for example (but not limited to): a missing/expired certificate (e.g., a missing "X.509" certificate), a missing/deactivated port, an unhealthy port (e.g., a port that cannot perform its functionalities), a firmware related issue (e.g., a firmware that is not signed/authorized properly, a firmware related issue that is caused by a wrong driver choice made by the user of the storage system, etc.), a software issue (e.g., a network time protocol (NTP) related issue (e.g., "Stratum: 0" (not synced)), a misconfigured domain name system (DNS) setting, an IP-to-IP routing related issue, etc.), a hardware issue, an expired (or out of compliance) OS patch, an OS related issue that is triggered by a missing certification, etc.

In one or more embodiments, the IMA may classify the installation errors/anomalies according to each error's technical meaning (where storage system anomalies and installation errors may be (syntactically) worded differently per log) as (i) an explicit installation error or (ii) an implicit installation error. For example, explicit installation errors may appear explicitly as errors (or warnings) within a system log, while implicit installation errors may appear as storage system anomalies (and may be identified as a leading factor to other system installation errors).

In Step 206, as a result of the first determination in Step 204 being YES, the IMA notifies the RA about the detected installation issues related to the storage system. In Step 208, in response to the notification, the RA inspects the storage system/platform by sending a request (e.g., an API call/request, a secure shell (SSH) request, etc.) to the storage platform to determine that the installation issues are indeed valid.

In Step 210, in response to the request, the RA receives a response from the storage platform. In Step 212, based on the response, the RA makes a second determination (in real-time or near real-time) as to whether the installation issues are valid. Accordingly, in one or more embodiments, if the result of the second determination is YES, the method proceeds to Step 216 of FIG. 2.2. If the result of the second determination is NO, the method proceeds to Step 214.

For example, if the response indicates a storage system time that does not match an expected storage system time (determined by the RA using the CE-specific model), the RA may infer the installation issues (e.g., OS-level anomalies) as valid installation issues. Following Step 212, the method proceeds to Step 216 of FIG. 2.2.

In Step 214, as a result of the second determination in Step 212 being NO, the RA notifies (via a GUI of a corresponding client (e.g., 110A, FIG. 1.1) being used by the user) the user to indicate (i) that the detected installation issues/errors are not valid and (ii) the CE-specific model should be updated. In one or more embodiments, after receiving the user's approval on updating the CE-specific model, the RA may initiate updating (e.g., fine-tuning) of the CE-specific ML model to obtain an updated CE-specific ML model (to be used later for a better installation issue detection). In one or more embodiments, the method may end following Step 214.

Turning now to FIG. 2.2, the method shown in FIG. 2.2 may be executed by, for example, the above-discussed RA. Other components of the system (100) illustrated in FIG. 1.1 may also execute all or part of the method shown in FIG. 2.2 without departing from the scope of the embodiments disclosed herein.

In Step 216, as a result of the second determination in Step 212 of FIG. 2.1 being YES, the RA identifies (by employing the CE-specific ML model) a set of resolutions (e.g., a set of remediation steps) to fix the detected (and validated) installation issues (e.g., the OS-level anomalies). In one or more embodiments, in order to identify the set of resolutions, the CE-specific ML model may search for "valid/working" resolutions (e.g., in the IERD (e.g., 142, FIG. 1.1) and/or in the CE-specific database (e.g., 138, FIG. 1.1)) that resolved the same installation issues and/or similar installation issues before.

In Step 218, by employing the CE-specific ML model, the RA ranks/weighs/analyzes the set of resolutions to obtain a subset of resolutions as the most suitable resolutions to fix/remediate/overcome the detected installation issues. In one or more embodiments, the subset of resolutions may include a set of user commands and a set of KB articles related to the installation issues. For example, the subset of resolutions may specify a set of remediation steps ((i) "server iburst", (ii) "start the chronyd service, enter: sudo systemctl start chronyd", (iii) "enable chronyd, enter: sudo systemctl enable chronyd", (iv) "restart chronyd: sudo systemctl restart chronyd", (v) "verify that the NTP service is online, enter: sudo systemctl status chronyd.service", and (vi) "to check that the server is synced to the service, enter: chronyc tracking") to resolve the installation issues (related to the OS-level anomalies occurred during the installation procedure of the storage system).

In Step 220, based on Step 218 and using the GUI of the corresponding client, the RA initiates displaying of the subset of resolutions (e.g., a first resolution to overcome a current installation issue and a second resolution to overcome the forecasted installation issue) to the user of the storage system.

In Step 222, in response to the displaying (performed in Step 220), the RA makes a third determination (in real-time or near real-time) as to whether the subset of resolutions are accepted/validated by the user. Accordingly, in one or more embodiments, if the result of the third determination is YES, the method proceeds to Step 224. If the result of the third determination is NO, the method proceeds to Step 232.

In Step 224, as a result of the third determination in Step 222 being YES, the RA applies/performs the subset of resolutions to the storage system to resolve the installation issues. In Step 226, based on Step 224, the RA makes a fourth determination (in real-time or near real-time) as to whether the installation issues are resolved. Accordingly, in one or more embodiments, if the result of the fourth determination is YES, the method proceeds to Step 228. If the result of the fourth determination is NO, the method proceeds to Step 230.

In Step 228, as a result of the fourth determination in Step 226 being YES, the RA notifies (via the GUI of the corresponding client) the user to indicate that the installation issues are resolved by applying one or more of the subset of resolutions. In one or more embodiments, the method may end following Step 228.

In Step 230, as a result of the fourth determination in Step 226 being NO, the RA notifies (via the GUI of the corresponding client) the user to indicate that (i) the installation issues are not resolved by applying the subset of resolutions and (ii) the installation of the storage platform is failed. Following Step 230, the method proceeds to Step 236.

In Step 232, as a result of the third determination in Step 222 being NO, the RA makes a fifth determination (in real-time or near real-time) as to whether the user recommended a resolution (via the GUI of the corresponding client or by manually performing on the storage system) for the installation issues. Accordingly, in one or more embodiments, if the result of the fifth determination is YES, the method proceeds to Step 234. If the result of the fifth determination is NO, the method proceeds to Step 236.

In Step 234, as a result of the fifth determination in Step 232 being YES, the RA applies the resolution to the storage system. In one or more embodiments, the resolution may be a manual repair/support operation that is performed by the user for a second installation issue that the user experienced during a second installation procedure of a second storage platform. Thereafter, the RA may store the resolution to the IERD and/or may send a vectorized version of the resolution to the RAG engine for later use (e.g., where the resolution may be used to fine-tune the CE-specific ML model, where the resolution may be identified as the best fix for a similar installation issue, etc.).

In Step 236, (i) based on the negative outcome obtained in Step 230 and after receiving the user's approval on updating the CE-specific model, (ii) based on the negative feedback received from the user (in Step 222) and the resolution recommended by the user (in Step 232), or (iii) as a result of the fifth determination in Step 232 being NO, the RA may initiate updating (e.g., fine-tuning) of the CE-specific ML model to obtain an updated CE-specific ML model (to be used later for better installation issue detection and remediation/resolution). In one or more embodiments, the method may end following Step 236.

Turning now to FIG. 3, FIG. 3 shows a diagram of a computing device in accordance with one or more embodiments disclosed herein.

In one or more embodiments disclosed herein, the computing device (300) may include one or more computer processors (302), non-persistent storage (304) (e.g., volatile memory, such as RAM, cache memory), persistent storage (306) (e.g., a non-transitory computer readable medium, a hard disk, an optical drive such as a CD drive or a DVD drive, a Flash memory, etc.), a communication interface (312) (e.g., Bluetooth interface, infrared interface, network interface, optical interface, etc.), an input device(s) (310), an output device(s) (308), and numerous other elements (not shown) and functionalities. Each of these components is described below.

In one or more embodiments, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (e.g., a LAN, a WAN, Internet, mobile network, etc.) and/or to another device, such as another computing device.

In one or more embodiments, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing installation of a storage platform, the method comprising:

monitoring, by an installation monitoring agent (IMA), an installation procedure of the storage platform to obtain logs;

analyzing, by the IMA and using a computing environment (CE) specific model, the logs to extract an analysis report;

making, by the IMA and based on the analysis report, a first determination that an installation issue is detected during the installation procedure;

notifying, based on the first determination and by the IMA, a resolution agent (RA) about the installation issue;

inspecting, in response to the notification and by the RA, the storage platform by sending a request to the storage platform to determine that the installation issue is valid;

receiving, by the RA and in response to the request, a response from the storage platform;

making, by the RA, a second determination that the installation issue is valid;

identifying, based on the second determination and by the RA, a set of resolutions to fix the installation issue using the CE-specific model;

ranking, by the RA and using the CE-specific model, the set of resolutions to obtain a subset of resolutions;

initiating, by the RA and using a graphical user interface (GUI), displaying of the subset of resolutions to a user of the storage platform;

making, by the RA, a third determination that the subset of resolutions is not accepted by the user;

making, after the third determination and by the RA, a fourth determination that the user recommended a resolution for the installation issue;

based on the fourth determination:

applying, by the RA, the resolution to the storage platform; and initiating, by the RA, updating of the CE-specific model to obtain an updated CE-specific model.

2. The method of claim 1, wherein the installation procedure comprises a plurality of installation stages, and wherein the storage platform is being installed to the CE that is related to the user.

3. The method of claim 2, wherein the CE is a data center or a virtual private cloud.

4. The method of claim 1, wherein the storage platform is a software-defined storage platform.

5. The method of claim 1, wherein the installation issue is an operating system related issue that is triggered by a missing certification.

6. The method of claim 1, wherein the resolution is a manual repair operation that is performed by the user for a second installation issue that the user experienced during a second installation procedure of a second storage platform.

7. The method of claim 1, wherein the subset of resolutions comprises a set of user commands and a set of knowledge base articles related to the installation issue.

8. The method of claim 1, wherein the installation issue is a current installation issue that occurred during the installation procedure.

9. The method of claim 1, wherein the installation issue is a forecasted installation issue that would highly occur at a later installation stage of the installation procedure.

10. The method of claim 1, wherein a vendor trains a model before the model is converted into the CE-specific model.

11. The method of claim 10,
wherein the model is converted into the CE-specific model by fine-tuning the model based on CE-specific data obtained from a retrieval-augmented generation engine, and
wherein the CE-specific data comprises information with respect to a network topology of the CE, a set of certificates related to the CE, an operating system configuration related to the CE, and a firewall configuration related to the CE.

12. A method for managing installation of a storage platform, the method comprising:
monitoring, by an installation monitoring agent (IMA), an installation procedure of the storage platform to obtain logs;
analyzing, by the IMA and using a computing environment (CE) specific model, the logs to extract an analysis report;
making, by the IMA and based on the analysis report, a first determination that an installation issue is detected during the installation procedure;
notifying, based on the first determination and by the IMA, a resolution agent (RA) about the installation issue;
inspecting, in response to the notification and by the RA, the storage platform by sending a request to the storage platform to determine that the installation issue is valid;
receiving, by the RA and in response to the request, a response from the storage platform;
making, by the RA, a second determination that the installation issue is valid;
identifying, based on the second determination and by the RA, a set of resolutions to fix the installation issue using the CE-specific model;
ranking, by the RA and using the CE-specific model, the set of resolutions to obtain a subset of resolutions;
initiating, by the RA and using a graphical user interface (GUI), displaying of the subset of resolutions to a user of the storage platform;
making, by the RA, a third determination that the subset of resolutions is accepted by the user;
based on the third determination:
applying, by the RA, the subset of resolutions to the storage platform;
making, by the RA, a fourth determination that the installation issue is resolved; and
notifying, in response to the fourth determination and by the RA, the user to indicate that the installation issue is resolved using the GUI.

13. The method of claim 12,
wherein the installation procedure comprises a plurality of installation stages, and
wherein the storage platform is being installed to the CE that is related to the user.

14. The method of claim 13, wherein the CE is a data center or a virtual private cloud.

15. The method of claim 12, wherein the storage platform is a software-defined storage platform.

16. The method of claim 12, wherein the installation issue is an operating system related issue that is triggered by a missing certification.

17. The method of claim 12, wherein the subset of resolutions comprises a set of user commands and a set of knowledge base articles related to the installation issue.

18. The method of claim 12, wherein the installation issue is a current installation issue that occurred during the installation procedure.

19. The method of claim 12, wherein the installation issue is a forecasted installation issue that would highly occur at a later installation stage of the installation procedure.

20. A method for managing installation of a storage platform, the method comprising:
monitoring, by an installation monitoring agent (IMA), an installation procedure of the storage platform to obtain logs;
analyzing, by the IMA and using a computing environment (CE) specific model, the logs to extract an analysis report;
making, by the IMA and based on the analysis report, a first determination that an installation issue is detected during the installation procedure;
notifying, by the IMA, a resolution agent (RA) about the installation issue;
inspecting, in response to the notification and by the RA, the storage platform by sending a request to the storage platform to determine that the installation issue is valid;
receiving, by the RA and in response to the request, a response from the storage platform;
making, by the RA, a second determination that the installation issue is valid;
identifying, in response to the second determination and by the RA, a set of resolutions to fix the installation issue using the CE-specific model;
ranking, by the RA and using the CE-specific model, the set of resolutions to obtain a subset of resolutions;
initiating, by the RA and using a graphical user interface (GUI), displaying of the subset of resolutions to a user of the storage platform;
making, by the RA, a third determination that the subset of resolutions is accepted by the user;
based on the third determination:
applying, by the RA, the subset of resolutions to the storage platform;
making, by the RA, a fourth determination that the installation issue is not resolved;
notifying, based on the fourth determination and by the RA, the user to indicate that the installation issue is not resolved using the GUI; and
initiating, by the RA, updating of the CE-specific model to obtain an updated CE-specific model.

* * * * *